Nov. 4, 1969 W. R. SMITH 3,476,088
CROSS-CONTAMINATION PREVENTION DEVICE
Filed Sept. 11, 1967
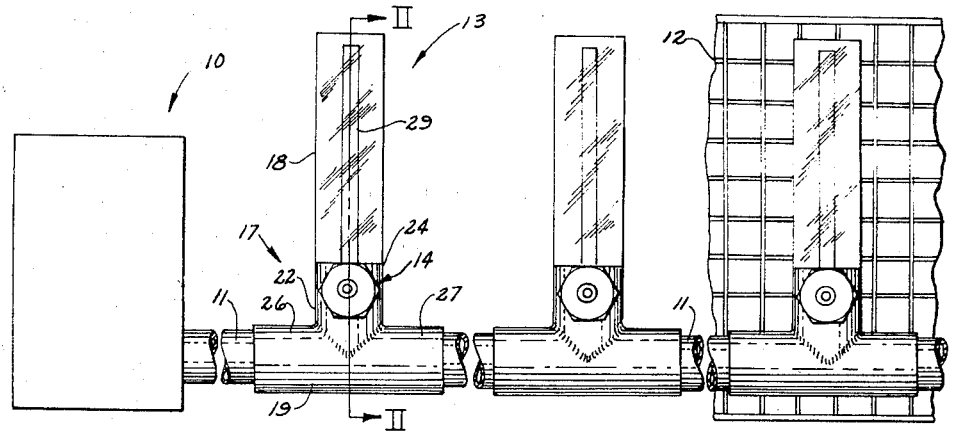
FIG. 1
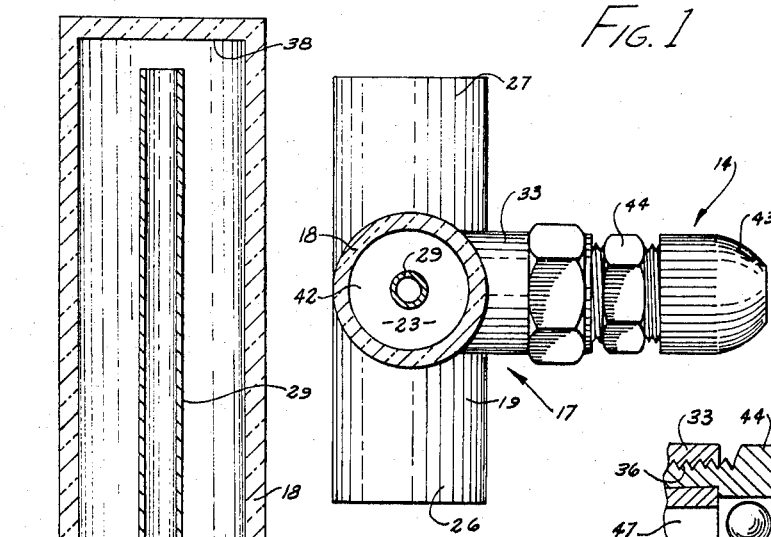
FIG. 2
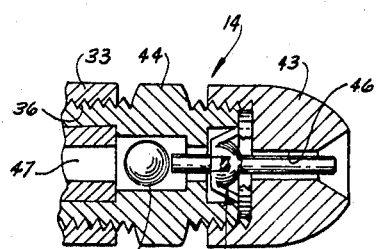
FIG. 3
FIG. 4
FIG. 5
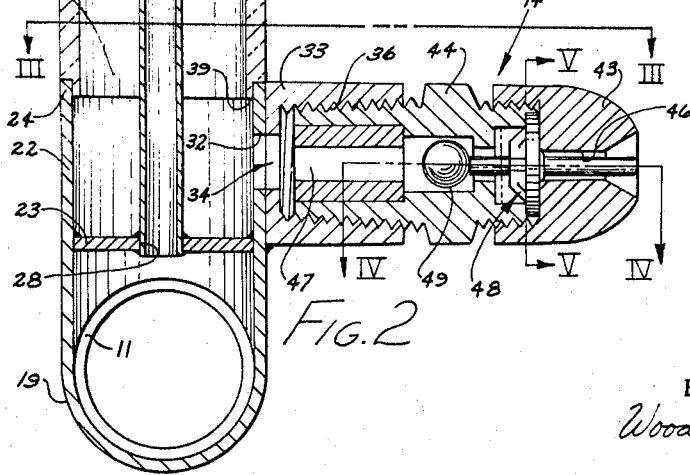
INVENTOR.
WILLIAM R. SMITH
BY
Woodhams, Blanchard and Flynn
ATTORNEYS

United States Patent Office 3,476,088
Patented Nov. 4, 1969

3,476,088
CROSS-CONTAMINATION PREVENTION DEVICE
William R. Smith, Kalamazoo, Mich., assignor to The Upjohn Company, Kalamazoo, Mich., a corporation of Delaware
Filed Sept. 11, 1967, Ser. No. 666,875
Int. Cl. A01k 7/00
U.S. Cl. 119—72.5         8 Claims

ABSTRACT OF THE DISCLOSURE

A liquid storage chamber having an outlet near the lower end thereof in which an externally and animal operable and normally closed valve is arranged. A standpipe within the storage chamber is connected to a source of liquid under pressure and the upper end of the storage chamber is filled with a gas. The pressure urging the liquid upwardly through the standpipe is preferably balanced by the pressure of the gas in said chamber when the storage chamber is substantially less than half full and, moreover, when the liquid level in the storage chamber is well below the upper end of the standpipe. Thus, whenever the valve is open, liquid will discharge from the outlet opening and it will be impossible, under normal operating conditions, for the liquid in the storage chamber to return through the standpipe to the supply thereof.

Background of the invention

This invention relates generally to a device for supplying liquids to small animals wherein said animals can operate a valve to initiate the flow of such liquid and, more particularly, to a type thereof in which contamination of the main supply of liquid is positively prevented so that more than one of these devices can be connected to the same supply without creating the problem of cross contamination.

The use of animal-actuated valves for discharging liquids from a supply thereof under pressure is very well known and such valves have long been in use. Examples of such valves are disclosed in Patent No. 3,008,451 entitled Animal Drinking Valve and Patent No. 3,215,119 entitled Animal Drinking Fount, which have been issued to the assignee of this application.

It is often desirable to supply a plurality of test animals, such as rodents, from a common source of liquid, such as water, during the test period. Usually it is convenient to dispense the liquid by connecting individual, animal-actuated valves to a supply conduit which passes through the several cages or the like in which the test animals are separately housed. In this manner, it is positively assured that each of the test animals will be receiving the same liquid regardless of whether it is merely water or a liquid including the test ingredients.

It is also well known that regardless of the care which is exercised in dispensing the liquid to each animal, some contamination of the general supply can occur if said supply is fed directly to the discharge opening in which the animal-actuated valve is installed. Accordingly, particularly where the therapeutic effect of certain drugs is being tested, inaccurate results may be obtained because of the cross contamination of the test animals, such contamination being effected through the liquid supply system.

Many attempts have been made to overcome this problem and some success has been achieved. However, contamination has been detected in sufficient numbers of test cases, where existing equipment has been used, that it could not heretofore be completely ruled out, at least where a distribution system of a reasonable and economically feasible type is used.

Accordingly, a primary object of this invention is to provide a device capable of connection between an animal-actuated, liquid-supplying valve and a supply of liquid under pressure whereby a portion of such liquid is completely separated from the supply liquid and located adjacent the upstream side of the valve so that contamination of the main supply is positively prevented, even if the portion of liquid becomes contaminated by the animal being serviced.

A further object of this invention is the provision of a device, as aforesaid, which operates completely automatically, which is arranged so that its satisfactory operation can be easily and visually detected, which is relatively inexpensive to produce, which can be easily connected into existing systems for the plural discharge of the liquid, and which can be used with existing animal-actuated valve mechanisms.

Other objects and purposes of the invention will become apparent to persons familiar with the type of equipment disclosed herein upon reading the following descriptive material and examining the accompanying drawings, in which:

FIGURE 1 is a broken, side elevational view of a liquid supply system including a plurality of the devices by which cross contamination is prevented.

FIGURE 2 is a sectional view taken along the line II—II in FIGURE 1.

FIGURE 3 is a sectional view taken along the line III—III in FIGURE 2.

FIGURE 4 is a sectional view taken along the line IV—IV in FIGURE 2.

FIGURE 5 is a sectional view taken along the line V—V in FIGURE 2.

For convenience in description, the terms "upper," "lower," "front," "rear" and words of similar import will have reference to the supply system and the devices of the invention as appearing in FIGURE 1 showing the front sides of said devices. The terms "inner," "outer" and derivatives thereof will have reference to the geometric center of said devices and parts associated therewith.

Summary of the invention

The objects and purposes of the invention, including those set forth above, have been met by providing a vertically elongated container defining a liquid storage chamber having an outlet near the lower end thereof. An upright standpipe is disposed within the chamber and communicates between the upper end of said chamber and an inlet pipe located near the lower end of the storage chamber. Alternately, the standpipe can extend along the outside of the chamber and communicate with the upper end thereof. An animal-actuated valve assembly is connected to the outlet of the storage chamber and the inlet pipe is connected to a source of liquid under pressure. The air or other gas trapped within the upper end of the storage chamber regulates the flow of liquid from the supply thereof into the storage chamber and maintains the level of the liquid within the storage chamber safely below the upper end of the standpipe. Thus, even though the liquid disposed within the storage chamber becomes contaminated, it cannot comingle with the supply of fluid in the standpipe.

Detailed description

The liquid supply and discharge system, whereby a plurality of animals can be independently service while avoiding cross contamination, is disclosed in FIGURE 1 as having a source 10 of liquid, such as water, under pressure and connected to a main supply conduit 11 which either extends through or adjacent to a plurality of separate animal-holding cages, one of which is indicated at 12. At least one, but usually a plurality, of contamination-preventing devices 13 are connected to the supply conduit 11, usually one such device within each cage 12, and an animal-actuated valve mechanism 14 is mounted upon each device 13.

The device 13 (FIGURE 2) is comprised of a storage container having upper and lower parts 18 and 19 which, in this particular embodiment, are substantially cylindrical and coaxial. The lower part 19 can be fabricated from any suitable material. The stem 22 of the T-shaped lower part 19 is provided with a partition 23 between the open, upper end 24 of said stem and the coaxial inlet and outlet pipes 26 and 27. The partition 23 may be fixed in place in any suitable manner and has a central opening 28 through which the lower end of the standpipe 29 is received. An opening 32 extends through the side of the stem 22 above the partition 23 and a female fixture 33 is mounted upon the stem 22 for connecting the opening 32 to the inlet end 34 of the valve mechanism 14. Specifically, the female fixture 33 has a central opening 36 which communicates with the opening 32 in the stem 22 and is internally threaded for threaded engagement with said inlet end 34 of the valve mechanism 14.

The upper part 18 (FIGURE 2) of the container 17 comprises a downwardly opening, tubular member having a sidewall 37 and top wall 38, both of which are preferably fabricated from a transparent material, such as Plexiglas, polyethylene, polyvinylchloride or the like. The lower end 39 of the sidewall 37 may be of reduced diameter for snug sliding reception into the upper end 24 of the stem 22 where it is rigidly held by adhesive means, such as an epoxy resin glue. The standpipe 29 extends a substantial distance upwardly into the chamber 42 defined within the upper part 18 and the stem 22 above the partition 23. Alternatively, the standpipe 29 can extend along the outside of the chamber 42. In either case, the upper end of the standpipe 29 can be provided with a drip ledge, if desired.

A gas, such as air, which may initially be at atmospheric pressure or an elevated pressure, is trapped within the chamber 42 before liquid from the source 10 is fed through the supply conduit 11. Such air is retained in the chamber 42 by virtue of the fact that the valve mechanism 14 is normally closed.

The valve mechanism 14 is comprised of a front body part 43 and a rear body part 44 having outlet and inlet passageways 46 and 47, respectively. A valve device 48 is arranged in the valve mechanism 14 for normally closing the outlet passageway 46. A checkvalve 49 may be disposed within the inlet passageway 47 for the purpose of preventing a backflow of liquid through the valve mechanism 14 and preventing the escape of liquid from the contamination prevention device 13 when the front body part 43 is disconnected from the rear body part 44, as for the purpose of cleaning same.

Operation

While the foregoing descriptive material is believed sufficient to indicate the operation of the invention to a skilled artisan, a brief summary is given hereinafter to facilitate a quick understanding of the invention. The inlet and outlet pipes of the lower part 19 are connected to lengths of a supply conduit 11 in a conventional manner. Either before or after such connection is completed, the upper part 18 is secured to the lower part 19 so that the standpipe 29 extends upwardly into the upper portion of the chamber 42. The valve mechanism 14, or some other equally satisfactory valve mechanism, is connected to the female fixture 33 after which the liquid is permitted to flow into the conduit 11 and, thereafter, upwardly through the standpipe 29. The liquid spills out of the standpipe 29 and runs down into the lower end of the chamber 42 where it collects until the pressure of the gas trapped in the upper part of the chamber 42 is compressed by the rising liquid in said chamber to balance the pressure urging the liquid upwardly within the standpipe 29. Under normal circumstances, this balance of air pressure and liquid pressure is achieved within the chamber 42 when the liquid level is approximately near the lower end of the upper part 18. Thus, there is no chance of contamination of the liquid within the standpipe 29 by the liquid disposed in the lower end of the chamber 42 during normal operation of the system.

When an animal desires liquid, it engages the valve device 48 and thereby permits liquid to flow through the passageways 46 and 47 from the portion of said liquid disposed within the lower end of chamber 42. As the liquid level is thereby lowerer in the chamber 42, the pressure of the gas thereabove is reduced and, accordingly, some of the liquid at the upper end of the standpipe 29 will spill over into the chamber 42 until the pressure differential has again been equalized. Because the upper part 18 of the container 17 is transparent, any air leak in the container 17 permitting the liquid level to rise to an unsafe level within the chamber 42 can be quickly and easily detected.

The embodiments of the invention in which an exclusive property or privilege is claimed are defined as follows:

1. In a system for supplying a liquid under pressure from a source to a normally closed animal-actuated valve means, a device for preventing contamination of said source, comprising:
   container means defining a storage chamber having an outlet opening near the lower end thereof communicating with said valve means;
   upright standpipe means having one end communicating with said chamber, the other end of said standpipe means being in communication with said source; and
   a gas within said chamber, the pressure of said gas and said liquid being substantially equal near the one end of said standpipe means when the level of liquid within said chamber is spaced substantially below said one end of said standpipe means.

2. A system according to claim 1, wherein said standpipe means extends upwardly through said container from a point near said outlet opening to a point near the upper end of said container means.

3. A system according to claim 1, including a plurality of said devices, the standpipe means of each device being connected to the same source of liquid under pressure.

4. An apparatus for supplying a liquid under pressure from a source thereof to an animal, comprising:
   container means defining an elongated storage chamber containing a gas and having an outlet opening near one end thereof;
   fixture means connected to said container and communicating with said outlet opening;
   standpipe means extending through said container means into said chamber near said one end thereof and extending to a point near the other end of said chamber;
   inlet pipe means connected to said container means near said one end of said chamber and communicating with the adjacent end of said standpipe means, said inlet pipe means being adapted for connection to said source; and
   normally closed valve means connected to said fixture means and communicating therewith.

5. An apparatus according to claim 4, wherein said chamber and said standpipe means are normally upright, wherein the upper part of said container means is transparent and the upper end of said standpipe means is near the upper end of said chamber, the liquid pressure and the length of said standpipe means being such that the pressure of the gas trapped in the upper end of said chamber becomes equal to the liquid pressure while the level of liquid in said chamber is spaced substantially below the upper end of said standpipe means.

6. An apparatus according to claim 4, wherein said valve means includes a pair of spaced checkvalve seats, a checkvalve disposed between said checkvalve seats and adapted to close one of said checkvalve seats at a time, a normally closed flow control valve and means on said control valve for holding said checkvalve away from one of said checkvalve seats.

7. In a system for supplying a liquid under pressure from a source to a normally closed animal-actuated valve means, a device for preventing contamination of said source, comprising:

container means defining a storage chamber having an outlet opening near the lower end thereof communicating with said valve means;

pipe means having one end communicating with said chamber, the other end of said pipe means being in communication with said source; and a gas within said chamber, the pressure of said gas and said liquid being substantially equal near the one end of said pipe means when the level of liquid within said chamber is spaced a predetermined distance from said one end of said pipe means.

8. In a system for supplying a liquid under pressure from a source to a plurality of normally closed animal-actuated valve mechanisms, structure for preventing contamination of said source, comprising:

container means defining plural storage chambers, each storage chamber having an outlet opening near the lower end thereof communicating with one of said valve mechanisms;

plural pipe means, each pipe means having one end communicating with one of said chambers, the other end of each pipe means being in communication with said source; and a gas within each of said chambers, the pressure of said gas and said liquid in each chamber being substantially equal near the one end of each of said pipe means when the level of liquid within said chamber is spaced substantially below said one end of said pipe means.

References Cited
UNITED STATES PATENTS

| | | | |
|---|---|---|---|
| 2,115,499 | 4/1938 | Salvoni | 137—614.2 X |
| 2,995,147 | 8/1961 | Bergquist | 137—207 X |

HUGH R. CHAMBLEE, Primary Examiner